June 4, 1929.  P. J. CLIFFORD  1,716,209
AUTOMATIC TRAIN CONTROL APPARATUS
Original Filed Oct. 22, 1923   9 Sheets-Sheet 2
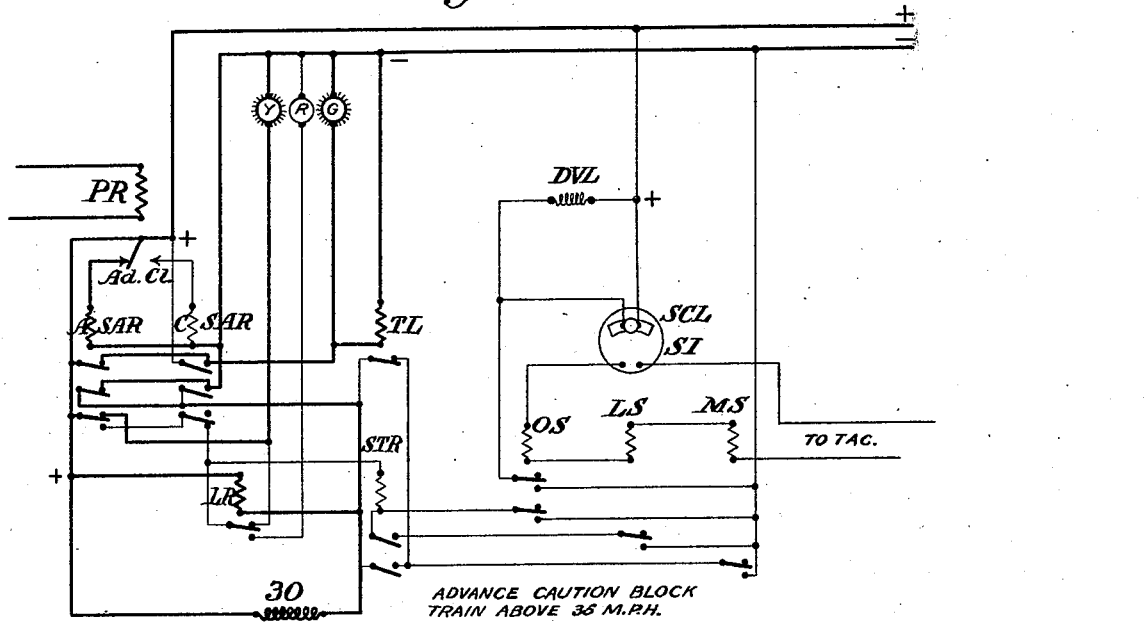
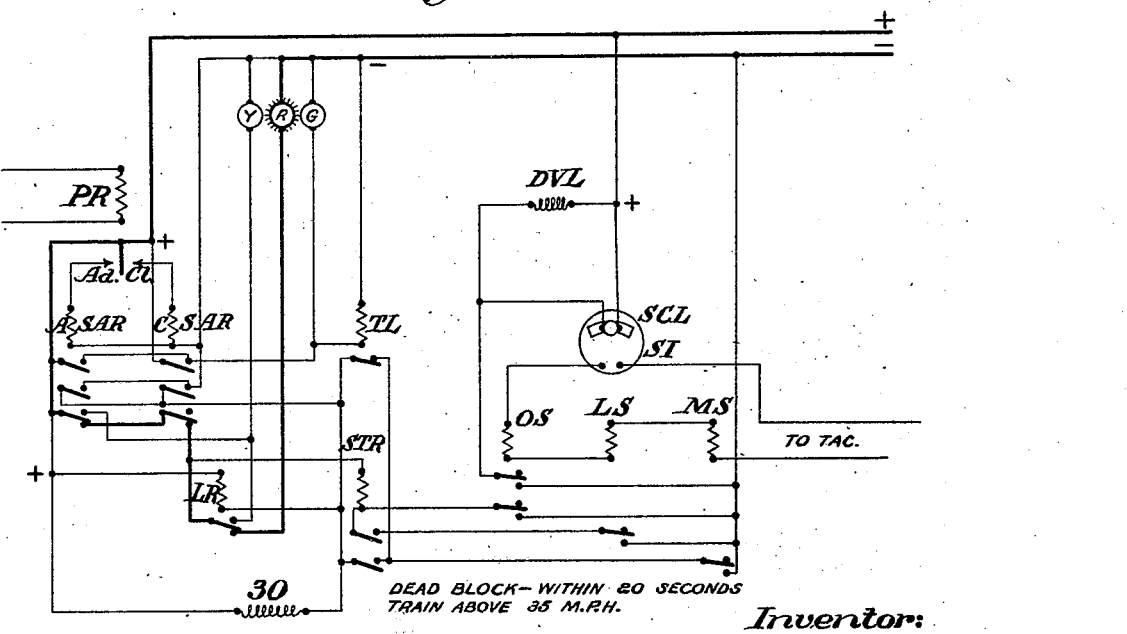
Inventor:
Patrick J. Clifford,
by Spear, Middleton, Donaldson & Hall
Attys.

June 4, 1929.  P. J. CLIFFORD  1,716,209
AUTOMATIC TRAIN CONTROL APPARATUS
Original Filed Oct. 22, 1923   9 Sheets-Sheet 3

DEAD BLOCK — WITHIN 20 SECONDS
TRAIN BELOW 35 M.P.H.

DEAD BLOCK — AFTER 20 SECONDS
TRAIN BELOW 35 M.P.H.

Inventor:
Patrick J. Clifford,
by Spear, Middleton, Donaldson & Hall
Attys.

June 4, 1929.  P. J. CLIFFORD  1,716,209
AUTOMATIC TRAIN CONTROL APPARATUS
Original Filed Oct. 22, 1923  9 Sheets-Sheet 4

Inventor:
Patrick J. Clifford,
by Spear, Middleton, Donaldson & Hall
Attys.

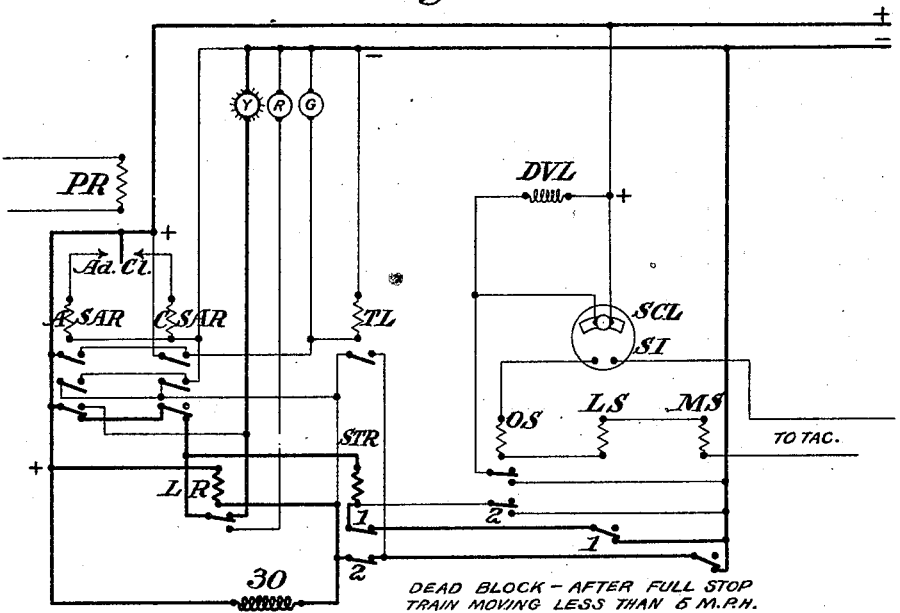
Fig. 9. DEAD BLOCK – AFTER FULL STOP TRAIN MOVING LESS THAN 6 M.P.H.
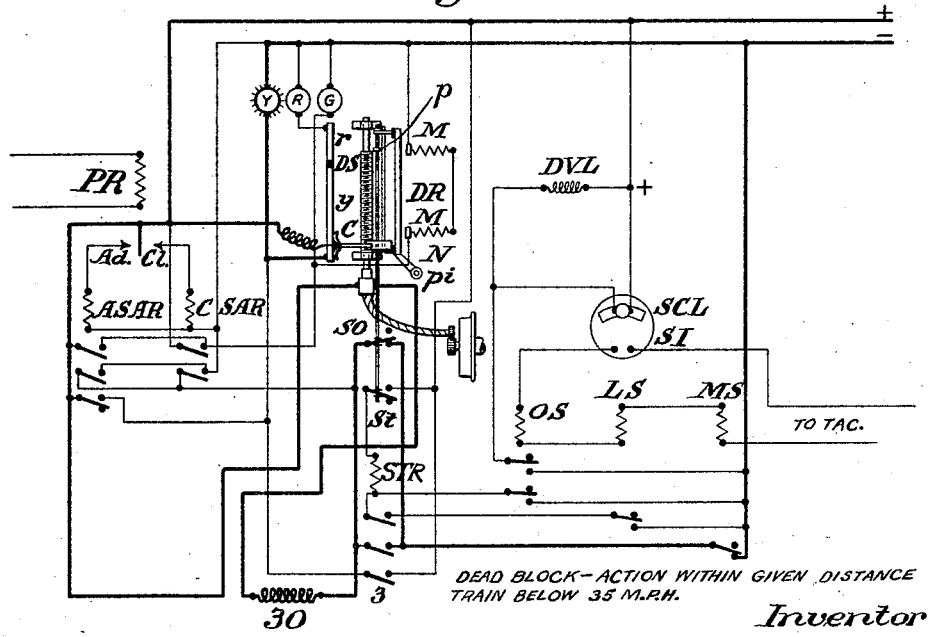
Fig. 10. DEAD BLOCK – ACTION WITHIN GIVEN DISTANCE TRAIN BELOW 35 M.P.H.
Inventor:
Patrick J. Clifford,
by Spear, Middleton, Donaldson & Hall
Attys.

June 4, 1929.   P. J. CLIFFORD   1,716,209
AUTOMATIC TRAIN CONTROL APPARATUS
Original Filed Oct. 22, 1923   9 Sheets-Sheet 6
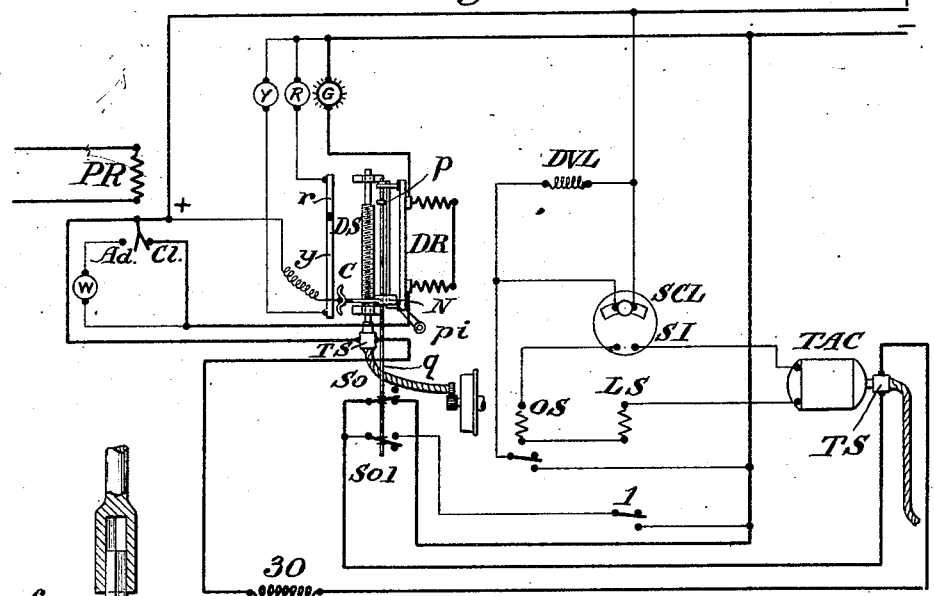
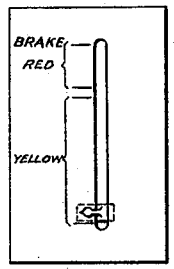
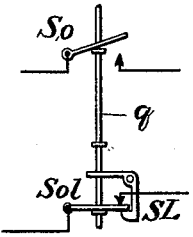
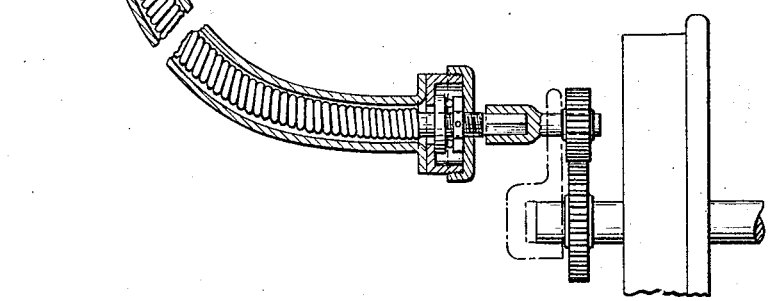
Inventor:
Patrick J. Clifford,
by Spear, Middleton, Donaldson & Hall
Attys.

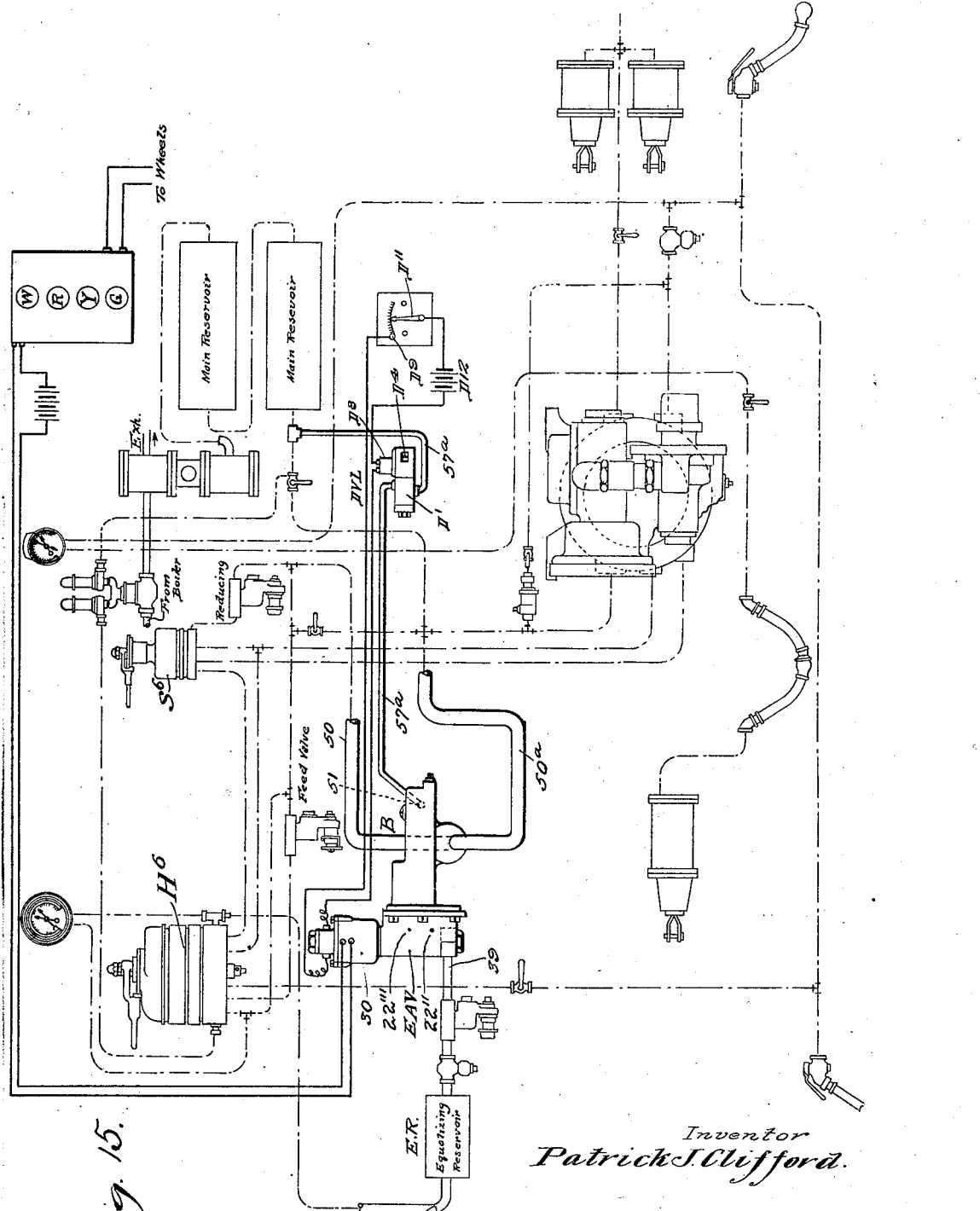

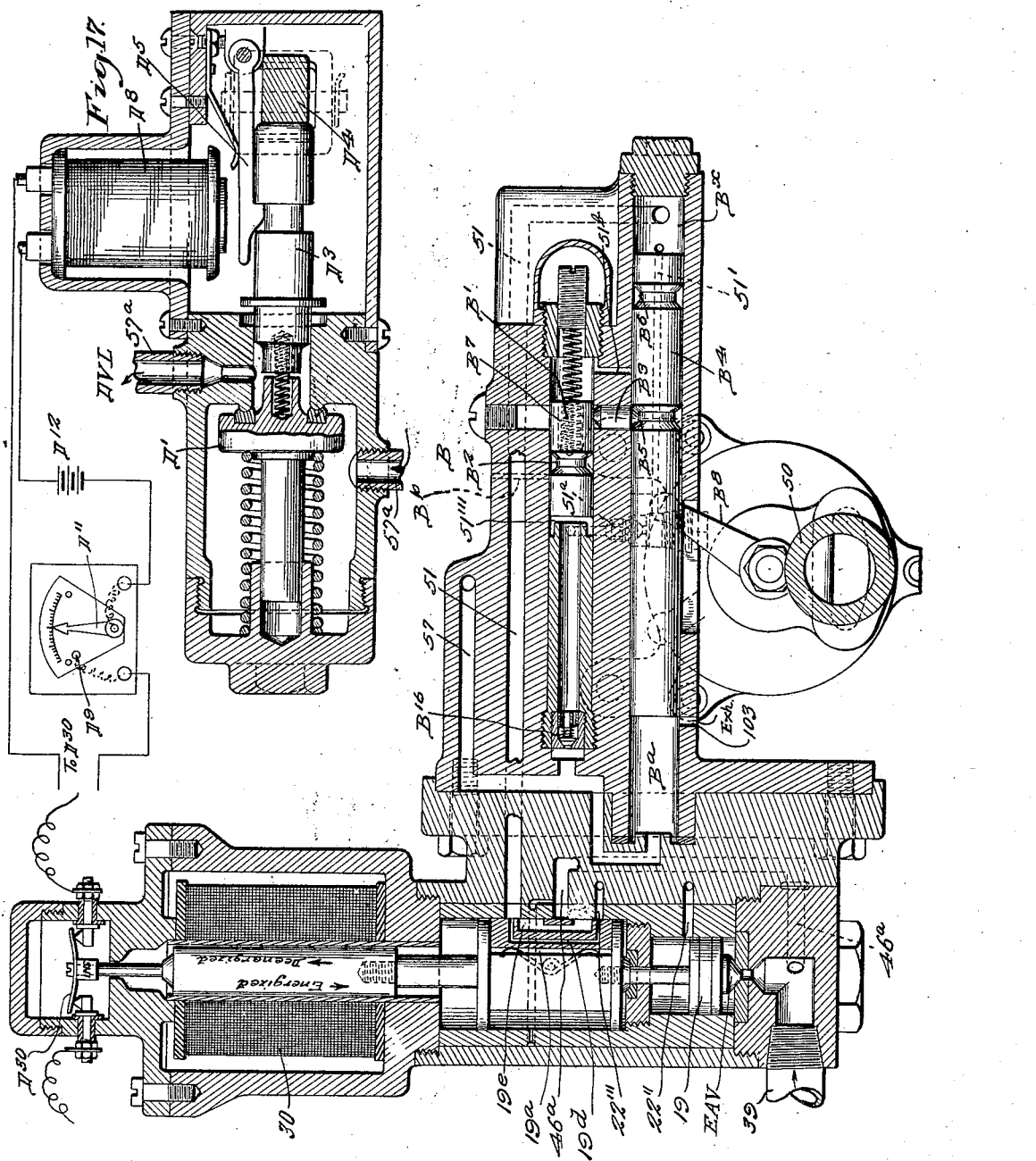

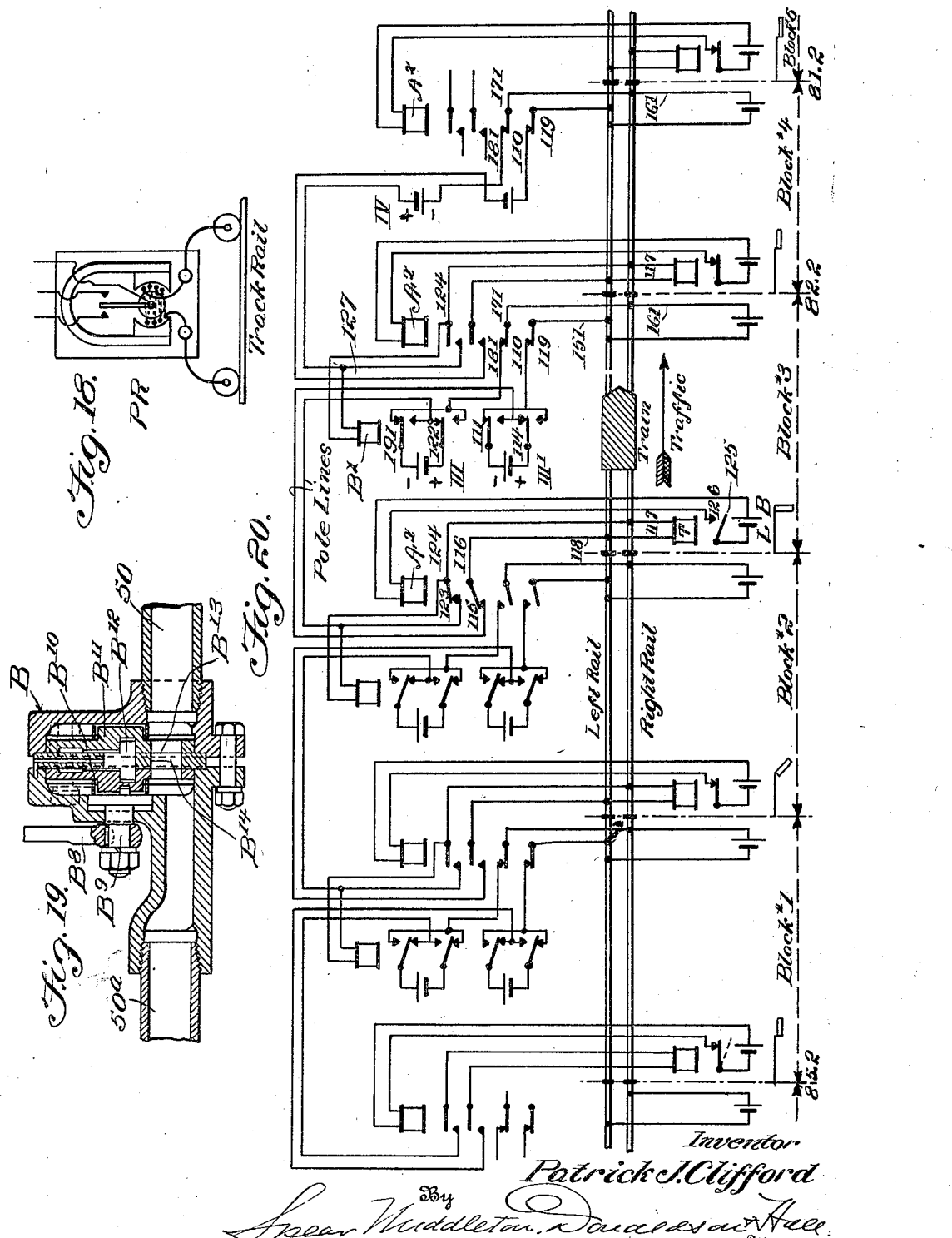

Patented June 4, 1929.

1,716,209

UNITED STATES PATENT OFFICE.

PATRICK J. CLIFFORD, OF PECKVILLE, PENNSYLVANIA, ASSIGNOR TO TRAIN CONTROL CORPORATION OF AMERICA, OF NEW YORK, N. Y., A CORPORATION OF DELAWARE.

AUTOMATIC TRAIN-CONTROL APPARATUS.

Application filed October 22, 1923. Serial No. 670,124.

The invention relates to the Clifford system of train control in which electric current is picked up from the traffic rail system, by a relay on the engine in a conductor in contact at its ends with the rail system, so as to receive current due to the potential drop between the points of contact of said conductor with the rails. This primary relay controls apparatus on the engine to give an indication, whether by signal means or train stop means, or both, on the engine, of the traffic condition of an adjacent or of a nearby block.

One object of the present invention is to provide means whereby after a required stop of the train has been effected either by the hand of the engineer or automatically, in a dead block, the engineer may proceed at a predetermined low speed, but may not exceed that speed, without getting another stop, until after the restrictive conditions in advance have cleared.

The accompanying diagrams Figs. 1 to 11 illustrate the apparatus on the engine under different conditions.

Figs. 12, 13 and 14 are details.

Fig. 15 is a diagram of the air system.

Fig. 16 is a view of an automatic air release valve and an engineer's disabling valve.

Fig. 17 is a view of locking means for the engineer's disabling valve.

Fig. 18 is a diagrammatic view of the primary relay PR.

Fig. 19 is a detail view of the engineer's disabling valve.

Fig. 20 is a diagram of track circuits.

Figure 1:
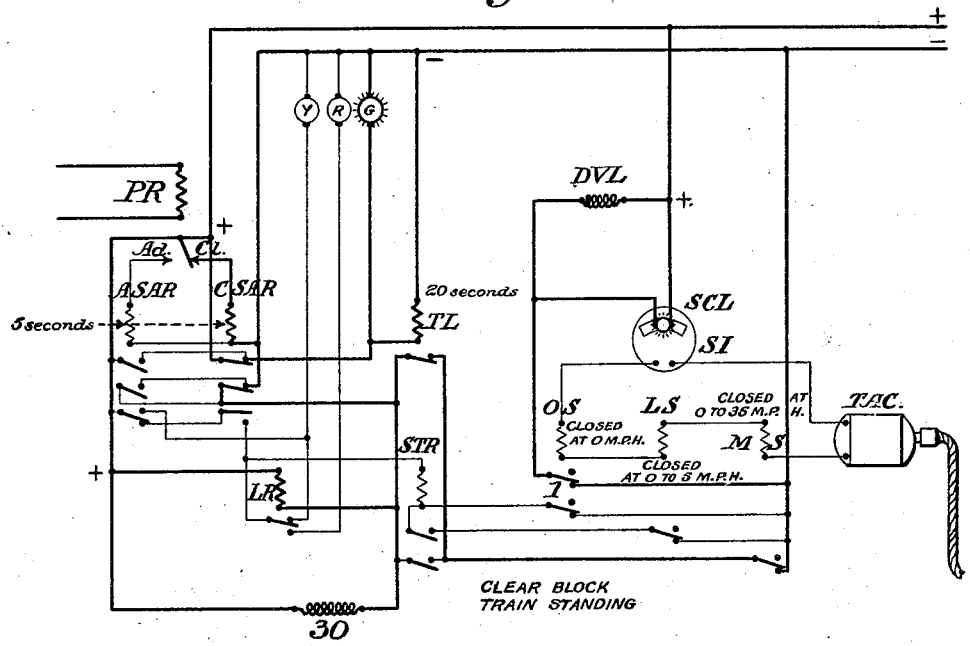

The apparatus includes, a primary relay PR on the engine in a conductor receiving current from the traffic rails of a live block, said relay being of the form shown in Fig. 18 and hereinafter more fully referred to, said primary relay being indicated in other figures conventionally at PR; also a "clear" or normal relay CSAR; an advance signal relay ASAR; a time limit relay TL, to defer automatic braking, say, for 20 seconds, in a caution block, at moderate speed; a brake solenoid 30 controlling the setting of the brakes, and cab signals Y, R and G, indicating yellow, red and green. The primary relay, as in the Clifford system, has three positions, neutral, when the engine is in a dead block; on contact C1, when the engine is on an energized block with clear conditions ahead, and on contact A$d$, when the engine is on an advance block, i. e., an energized block, with restrictive conditions existing in the second block ahead, i. e., the block next on the other side of the caution block. The ASAR and CSAR relays are five seconds retarded.

Speed control is accomplished in the present invention through a circuit including four elements, viz: a speed indicator SI having a pointer and index, and three relays of which the one marked OS has its contact closed when the engine is at rest: LS (low speed) is closed at any speed from 0 to say 5 M. P. H. and MS (moderate speed) is closed at any speed from 0 to say 35 M. P. H. The circuit which includes these four elements derives its current from a tachometer (magneto or voltage generator) marked TAC driven from the axle of the engine by a flexible shaft. These three speed relays are adjusted as to torque to give the different contact closing effects stated above.

There is also in this system a magnet or solenoid DVL (disabling valve lock) controlling a lock for the engineer's disabling valve, which, when the train comes to a stop, will be energized to release the lock and thus release the disabling valve, so that it can be returned to normal open position to restore control to the engineer, this mechanism is shown in Figs. 15, 16 and 17, as an example. This disabling valve is to insure the train coming to a stop when automatic braking takes place, and it may be of any desired form.

The solenoid 30 controls braking by controlling a valve EAV. The said valve when seated by the energized solenoid 30 cuts off the escape of equalizing reservoir pressure through pipe 39 and thus holds the brakes off. When the solenoid is deenergized equalizing reservoir pressure coming through pipe 39 will open the valve EAV and cause valve 19 to move, causing ports 46$^a$ and 51 to communicate by the shifting of the valve portion 19$^a$ and equalizing reservoir air will thus pass to the right hand side of the piston B$^4$ and this will move leftward and operate arm B$^3$ to turn a valve into position to cut off connection between the main reservoir and the usual brake system, such as Westinghouse, and thus render the engineer incapable of recharging the train line.

In doing this the valve B$^3$ cuts off pipe 50$^a$ from pipe 50.

The piston 19 continuing its travel opens port 22″ allowing pressure in chamber D of Westinghouse automatic brake valve $H^6$ to go to atmosphere, thus reducing train line pressure and causing an automatic brake application.

A disabling valve lock DVL is used to maintain the engineer's disabling valve in the position just discussed for preventing the engineer from recharging the train pipe and releasing the brakes. This lock is not applied directly to the engineer's disabling valve though this might be done. Instead it is applied to a valve D, which cuts off communication between the sections of pipe $57^a$ leading from the main reservoir to the conduit 57 which leads to the left hand side of the piston $B^4$ of the disabling valve for forcing it to the right to open up communication between pipe $50^a$ and 50. This valve can be unseated to supply air pressure to conduit 57 for restoring the engineer's disabling valve to normal open position by a hand lever $D^4$, but this hand lever cannot be operated until the train has come to a stop, because a lock $D^5$ holds the stem $D^3$ locked and it is this stem which must be operated by the handle $D^4$ in order to unseat $D^1$ and allow air to go to the disabling valve to restore it. This lock is controlled by a magnet $D^8$ which when the train is running is deenergized. The deenergizing of the magnet $D^8$ and the consequent release of the disabling valve lock $D^5$ of DVL to enable the engineer to restore the engineer's disabling valve to open position is dependent on two factors.

One of these is the closing of contact at $D^{30}$ when the solenoid 30 is again energized and the valve EAV has closed consequent upon the train coming down to the prescribed low speed of say 5 miles per hour, and the other factor is the closing of the tachometer pointer $D^{11}$ on contact $D^9$ when the train comes to a stop. When this happens the brake solenoid has been energized and so far as this is concerned the train is ready to proceed excepting that the brakes have not yet been released.

The release of the brakes is dependent upon restoring the disabling valve to open position, so that the engineer can recharge the train line, but this cannot be done until after the train has come down to the prescribed condition, i. e. to a stop with tachometer pointer $D^{11}$ closed onto contact $D^9$.

Both contacts $D^9$ and $D^{30}$ are in the circuit of the tachometer and magnet $D^8$. The battery of this circuit is at $D^{12}$. This tachometer contact may be no speed contact OS of the tachometer. Instead of battery $D^{12}$ the main battery may be used.

When the valve EAV closes it brings the port $19^d$ in valve member $19^a$ into position to connect passage 51 with a supplemental exhaust port 22‴ leading to atmosphere, so that in restoring the engineer's disabling valve to open position (at the right) air pressure will discharge through this port from the right hand side of the piston $B^4$. When pressure enters the passage 57 to the chamber Ba, and has forced the piston $B^4$ rightward to open the engineer's disabling valve, this pressure exhausts through port 103.

Referring to certain details of the engineer's disabling valve, it will be noted that the piston $B^4$ is normally locked by a plug $B^3$. The first effect of air pressure entering through ports $46^a$ and 51 upon opening of valve EAV is to supply chamber Bx from whence air pressure goes through port 51′ and check valve $51^a$ to space 51‴ at left of plunger $B^1$ thus forcing this plunger rightward until its groove $B^2$ comes opposite the plunger $B^3$ whereupon said plunger is free to rise into said groove and release the piston $B^4$ which then under pressure of air in chamber Bx moves leftward and operates arm $B^8$ to close pipe $50^a$ which cuts off air from the engineer's automatic brake valve and thus prevents the engineer from recharging the train pipe, and releasing the brakes.

When piston $B^4$ reaches its leftward limit it is locked by the plunger $B^3$ falling into the notch $B^6$ and as soon as this happens the piston $B^1$ will move leftward owing to the air pressure entering through port $51^b$ which pressure added to that of the spring $B^7$ (which latter may be omitted) will give the piston $B^1$ the movement stated. This will bring the plain part of this piston over the locking plunger $B^3$ and hold this down.

The parts will be held in this position with the engineer's automatic service valve ($H^6$ Westinghouse) disabled until pressure has bled away from chamber Bx back through port 51, $19^d$ to atmosphere through port 22‴ (the valve EAV having closed) and also until the disabling valve lock has been released by reason of the train coming to a stop and finally until the engineer after the above conditions have been assumed, operates the valve $D^1$ or other valve to supply air pressure through port 57. This air pressure will pass through a check valve $B^{16}$ to the left hand side of the piston $B^1$, thus moving it to the right to bring the groove $B^2$ thereof in line with locking plunger $B^3$, so that the latter can rise and not obstruct the movement of piston $B^4$ back to normal position, which happens because of the pressure of air exerted in the chamber Ba supplied through port 57. This air finally exhausts through port 103. When the piston $B^4$ is all the way towards the right, the plunger $B^3$ drops into the notch $B^5$ to lock the piston $B^4$ in its normal position. Thereupon the piston $B^1$ moves leftward under action of its spring $B^7$. A port Bp bleeds chamber 51‴ when $B^1$ is rightward.

Referring to Fig. 19, which shows the engineer's disabling valve per se, the arm $B^8$ is keyed to the shaft $B^9$ which rotates two discs $B^{10}$ and $B^{11}$ which are keyed to each other by a key B¹². The motion of the arm turns the discs to open or close an opening B¹³ in a stationary partition B¹⁴. When closed, this cuts off communication between the pipes 50, 50ᵃ, thus cutting off the supply of the main reservoir air from the engineer's automatic brake valve H⁶, and therefore preventing him from recharging the train line.

The relays marked LR and STR (stick relay) perform novel functions in the present invention, as will be described hereinafter.

The brake controlling solenoid, as just stated, operates to open the air supply valve EAV, when de-energized, and the opening of this valve supplies equalizing reservoir pressure to operate the apparatus which automatically releases train line air for setting the brakes and which automatically disables the engineer's automatic brake valve by closing the valves B¹⁰, B¹¹ in the connection which supplies main reservoir air to the engineer's automatic brake valve.

There is also provided in the present invention means for checking the proper operation of the speed control apparatus. Any failure or breakage in either the mechanical or electrical equipment of the speed control mechanism might, under certain conditions, cause a "false clear" failure. A failure of this character would, however, duplicate the conditions existing with the train standing still and the contact 1 of the OS (no speed) relay would be closed, because no current would be passing through its coil, and its contact would be at rest. This condition lights a light SCL, as will be seen in Fig. 1, where the heavy lines indicate the circuit through the light located, say, in the face of the speed indicator, and through the closed contact 1 of no speed relay OS. In this position or any other convenient one the light will notify the engineer that his speed control apparatus is out of service because of some failure therein. This notice of a fault will occur if the train is moving. If, however, the train is standing still, then the light becomes self-checking, since it should be normally lighted when the train is standing.

Figure 2:
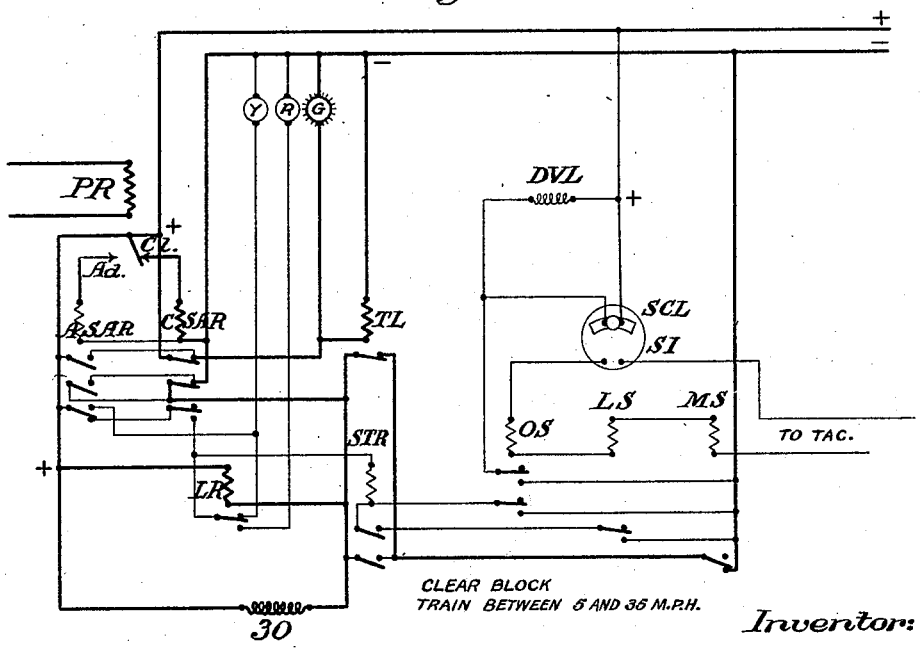

In the use of the apparatus a train in a clear block may proceed at any desired speed under a green light, and the condition of the signal circuits and the train control circuit may be traced in Figs. 1 and 2, in which the heavy lines represent the active circuits.

It will be noted that the primary relay is receiving current from the traffic rail system of the energized block and has closed on normal contact C¹ and that brake controlling solenoid 30 is energized and the brakes are off. In Fig. 2, the train being in motion, the speed control light SCL is out.

Fig. 3 shows the circuits when the train is in an "advance" block energized by a current whose polarity has been reversed, due to restrictive conditions existing in the block, next beyond the caution block, see Fig. 20 and the description relative thereto occurring hereinafter. In such case the primary relay PR closes on contact Ad, and the yellow signal is lighted, in addition to the green, informing the engineer, in advance of the caution block, of the restrictive condition in the next block beyond the caution block. In this Fig. 3 also it will be seen that brake solenoid 30 is still energized and the brakes are off. Also as the speed control features are operating properly, the speed control light SCL is out, the train speed being above 35 M. P. H. and all speed controlled contacts of OS, LS and MS being open.

Figure 5:
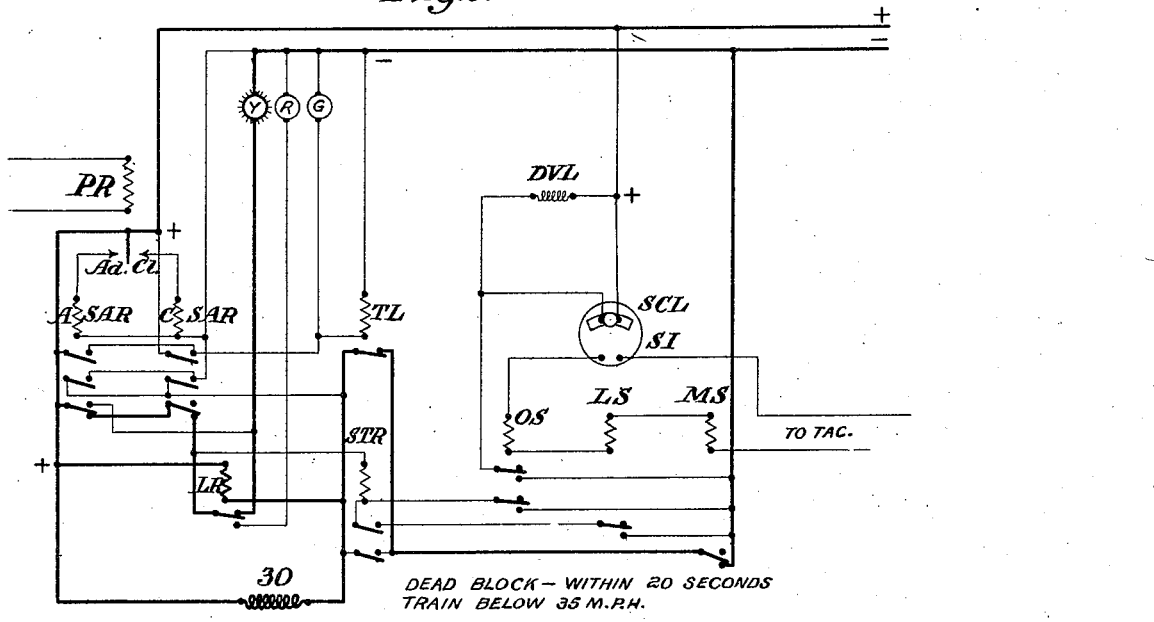

When the train passes a caution signal, and enters a dead block, primary relay PR goes to neutral position and an immediate brake application will result (Fig. 4), unless the train is proceeding at less than, say, 35 M. P. H., in which latter case a path of energization will be provided through the TL relay contact and the 0 to 35 M. P. H. contact, until the slow acting TL relay opens at the end of 20 seconds, (Figs. 5, 6 and 7), and yellow light is lighted as long as the brake application is withheld, as shown in diagram, Fig. 5, but when, after the delay of 20 seconds, the solenoid 30, and hence relay LR, are deenergized, the red light is lighted, as in Fig. 6.

Figure 8:
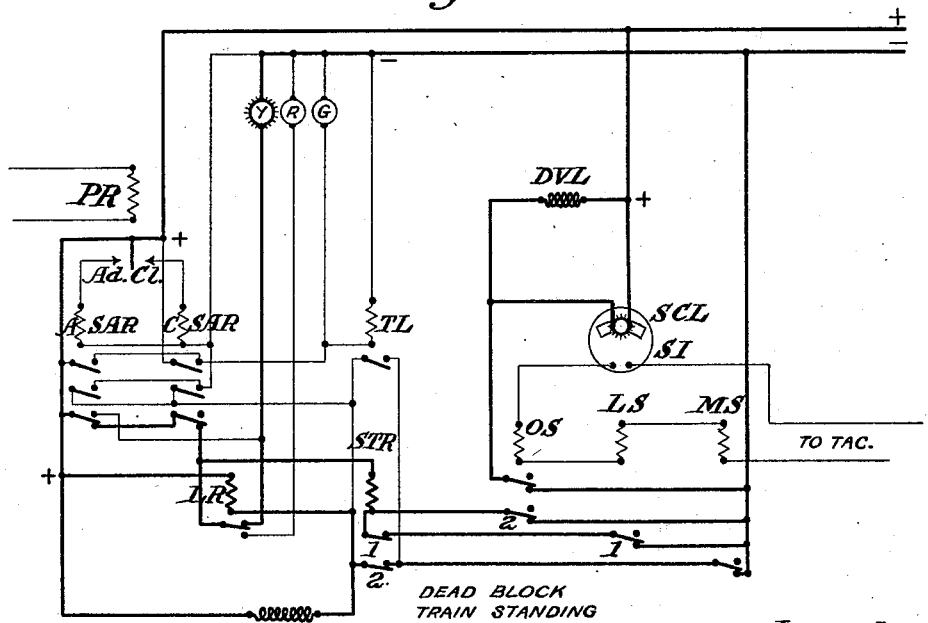

After a brake application, either automatic or manual, and the train has come to a full stop, the solenoid 30 is immediately energized as a result of this stopping, and this effect is shown in Fig. 8, it being due to the closing of contact 2 of stick relay STR, and which relay was energized by the making of the contact 2 of no speed relay OS.

When the stick relay STR is energized as a result of the closing of contact 2 of the no speed relay OS, an additional path of current is established for keeping this stick relay energized, through its own contact 1 and the contact 1 of the low speed relay LS. Hence, although the train starts and the contact 2 of the no speed relay OS opens as shown in Fig. 9, the stick relay STR will be maintained energized so long as this low speed is maintained, say, at or below 5 M. P. H.

Figure 6:
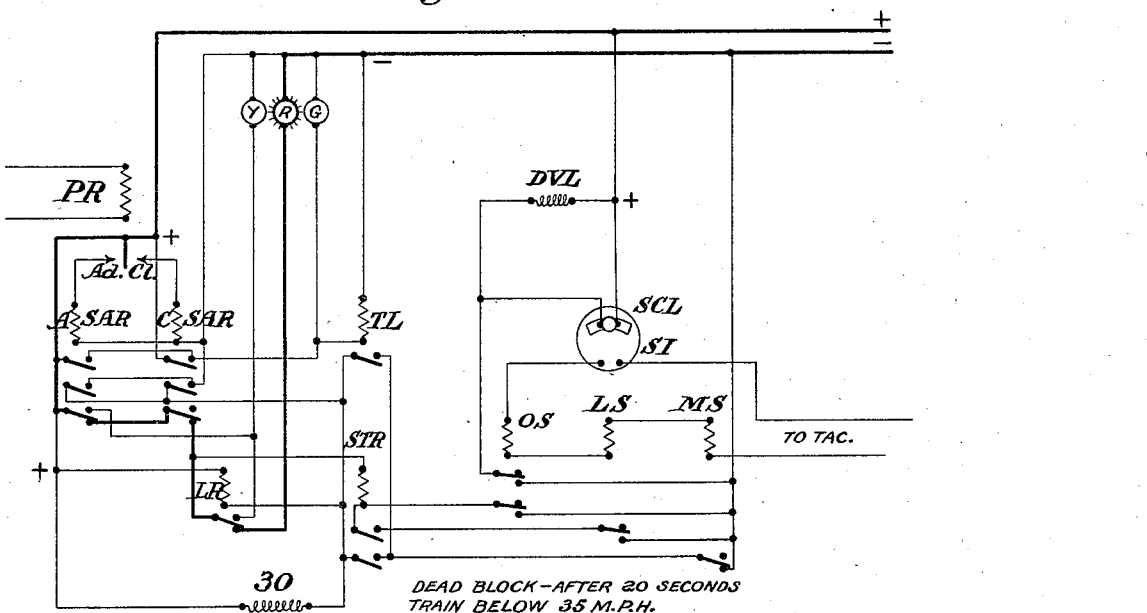
Figure 7:
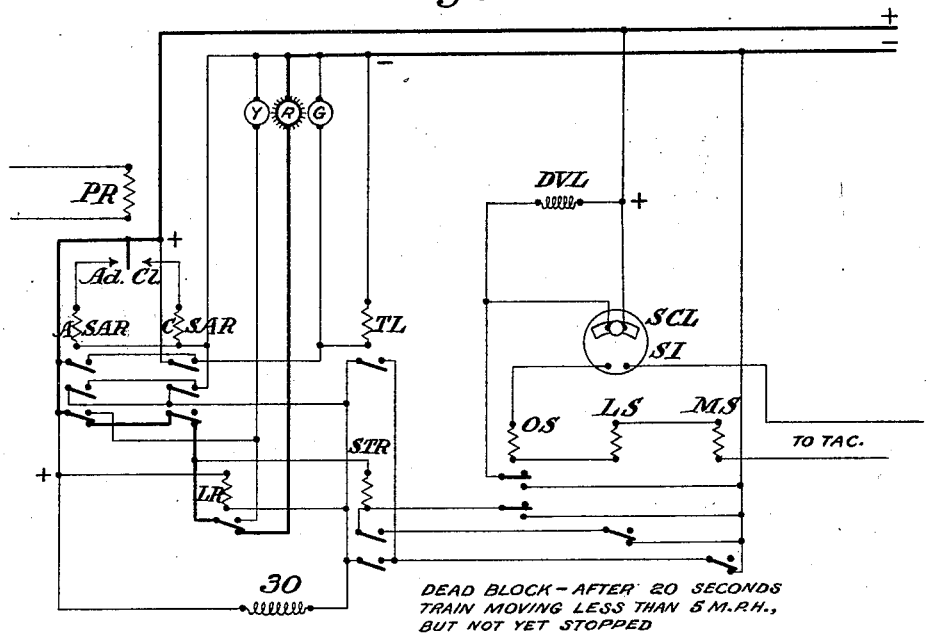

If, however, the train exceeds this speed, then the contact 1 of the low speed relay LS will open and stick relay STR will be deenergized and its contacts 1 and 2 will open and the brake solenoid again will be deenergized and the brakes will be set, this condition being represented in Fig. 6, and with the red lamp lighted.

It may be noted that for the advance signal the yellow and green lights are used.

The primary relay is in continuous conductive connection with the electrical track system, but is not limited to its use with direct current in said system.

As another form of apparatus a distance control relay may be employed, taking the place of certain of the relays above described.

This distance control relay in one form of the invention may take the place of the time limit relay TL, and in another form it may take the place of the TL relay and other relays. This distance control relay, as shown in Fig. 10 at DR, will, under all conditions, stop a train in a dead block at a prescribed distance after passing a caution signal, regardless of its speed or the number of intermediate stops it may make, so long as the block remains dead. If, however, the signal ahead goes to caution or clear, the relay DR is reset, and no automatic stop occurs. If an automatic stop occurs at a high speed—i. e., passing the caution signal at or above 35 M. P. H.—the train must be brought to a full stop to release the disabling valve lock DVL, after which it may proceed up to 35 M. P. H., until the distance specified is traversed, when it will again be stopped.

The stick relay STR comes into action only after the distance relay DR has functioned, when its function is the same as in the preceding circuits.

The light relay LR is eliminated when this distance control relay is employed. By means of a shoe or sliding contact C on the DR relay, the yellow light is lighted as soon as the train enters a dead block. As the carriage or nut N on the relay screw DS moves, the red light R is lighted, indicating the approach of the braking point. As the braking point is reached, the yellow light goes out, and the brakes are applied. As soon as relay STR is energized, the yellow light is again lighted, indicating to the engineman that he may proceed under control speed.

The mechanical construction of the DR relay is as follows:

A screw shaft DS is mounted on the engine, preferably with its axis extending upwardly, and is driven by a suitable connection or flexible shaft from one of the axles. This screw shaft is adapted to cause a nut N to travel thereon, which nut is controlled as to its engagement with the screw by magnets M. This nut is connected with a contact C which travels in relation to a series of contacts controlling in proper sequence signal lights and also controlling by physical engagement certain contacts controlling the brake solenoid circuit and the stick relay circuit, so as to open the solenoid circuit and close a contact in the stick relay circuit, these contacts being indicated in Fig. 10 at *so* and *st* respectively.

In the operation of this part of the apparatus, supposing the engine enters a caution block, the magnets M will be deenergized by the primary relay arm assuming neutral position, and the armature of magnets M will be released, allowing the nut N to engage the screw, which nut will then begin to traverse the screw, carrying with it the contact slide C. The yellow signal will light up, as soon as contact C strikes the section $y$ of the contact strip. The yellow light will persist, while the sliding contact C maintains engagement with the contact strip $y$. The green light went out when primary relay PR assumed neutral position, owing to the engine being in the dead block. The contact C, as the train approaches the braking position, will first bridge the break in the contact strip $y$ and the red light R will come on, the yellow still persisting, until the contact C has crossed the break and is on the portion $r$ of the contact strip, when the yellow light will go out and the red will persist alone, and at or about this time the contact *so* will be opened and the contact *st* will be closed of the solenoid and stick relay circuits respectively.

Upon entering live territory and reenergizing of the magnet M, the nut N will be withdrawn from the screw shaft and thereupon it and the contact slide C will be returned to normal position at the starting end of the screw shaft.

When the stick relay is energized by the train coming to a stop, its contact 3 closes and the yellow signal is again lighted, indicating to the engineer that he can again proceed with caution.

The screw shaft and armature may be arranged slightly out of vertical position and the armature may be pivoted at $pi$ so that when released by the deenergizing of the relay magnet the armature will fall by gravity and the nut will thus be imposed on the screw in a positive manner, whereon it will rest. The position of these parts, however, is such that when the nut is released from the screw it will fall by gravity, together with contact C, to the starting point.

It will be understood that when the nut C runs off of the screw at its upper end, it will be maintained in this upper position by resting on the shoulder of the screw, until the magnet M is energized and the armature is drawn back, carrying the nut with it, whereupon the nut will be drawn away from its support on the shoulder and will fall by gravity back to its starting point.

In Fig. 11 I show a form of apparatus in which a number of relays heretofore described are omitted, namely, the CSAR, ASAR, the time limit relay TL, the stick relay STR, and the medium speed relay MS.

In this form the distance control relay DR is a retarded relay to take care of any temporary opening of the primary relay PR. The swinging arm of this PR relay is provided with divergent spring contact ends which will take care of certain irregularities which might result from undue vibration.

It the use of this form of apparatus the operation would be as follows:

*Clear condition.*—Under clear conditions ahead, the armature of relay PR will be on contact CL and current will go from plus of battery through CL, slow acting magnet of distance control relay DR, and through green signal light to minus of battery. The yellow light will be out and also the red, because the contact C of nut N will not be in engagement with the contact strip $y$. Furthermore, the nut N will be in its normal or lowest position out of contact with the distance screw shaft DS. Hence solenoid contact SO will be closed. Air brake solenoid 30 will be energized from plus of battery to safety device of tachometer shaft TS to solenoid, to contact SO to minus of battery.

*Advance condition.*—Now if, by reason of change of polarity in the track circuit, the arm of relay PR swings to the advance signal contact A$d$, the magnet of distance control relay DR, which is retarded, will remain energized, while this shift is taking place, and all conditions will remain as just stated in connection with the "clear condition", with the exception that in addition to the green light a white light W will be lighted, indicating in conjunction with the maintained green light that the vehicle is traversing an "advance" block, i. e., the one on the approach side of the caution block.

*Dead block.*—Now supposing the train enters a caution block. The arm of PR relay will assume neutral position because no imposed current exists in the track system to be picked up. The armature of the distance control relay DR will fall away from the deenergized magnet and the nut N will be set into engagement with the distance control screw DS. Further the contact C will fall on the contact strip $y$ and, being attached to the nut, it will travel along the strip. The green light will go out as soon as magnet of DR is deenergized and the yellow light will go on by the completion of its circuit through C and $y$ and this will persist until the engine reaches a point somewhat in advance of braking distance from the entrance to the danger block when the red light will be lighted and both yellow and red will be on simultaneously, while contact C is bridging the insulated joint between the yellow and red sections of the strip $y, r$. Thereafter the contact C will travel only on the red light section of this strip and as the nut N nears the upper end of the screw shaft, only the red light will be lighted and the nut by striking the projection $p$ on the rod $q$, the latter will be raised, thus opening the contact SO and breaking the solenoid circuit, causing the EAV valve to open, supplying air to the Clifford automatic system as previously described, thus causing the opening of the automatic air release valve for releasing train line air and for setting the engineer's disabling valve in closed position to prevent him from recharging the train pipe, and rendering effective the lock which will maintain the engineer in disabled condition so far as releasing the brakes are concerned, until the train comes to a stop. In other words, the disabling means for preventing the engineer from releasing the brakes, once an automatic operation of the brakes is started, is such that before the engineer can again assume control of the running of the train (he can at all times make a further train pipe reduction), the train first must have come to a stop.

Now reverting to the deenergizing of the solenoid and the consequent automatic braking action, it will be understood that after solenoid is deenergized, the nut will continue to travel along the screw shaft while the train is coming to a stop after the brakes have been applied. In this final movement of the nut a contact $SO^1$ will be closed, preparing a circuit through the brake solenoid 30 to be completed through a five mile contact 1 of the low speed relay LS. This latter contact is made at any speed below 5 M. P. H., hence if after coming to a stop the engineer starts up again in the dead block, he can proceed at or below 5 M. P. H., but if he exceeds this speed while in the dead block, then contact 1 of LS relay will open, solenoid 30 will be deenergized and another stop will result.

There must be an interval between the breaking of the circuit of the brake solenoid at SO and the making of the circuit at $SO^1$, so that the brake solenoid will be deenergized. If $SO^1$ were made at the same time SO is broken, then, if this happened with the train running below 5 M. P. H. in the dead block, no stop would take place, because contact 1 of relay LS would be closed, together with contact $SO^1$, and this would not accomplish the specific object sought of bringing the train to a stop and then proceeding at a prescribed slow speed.

The interval between the breaking of the solenoid circuit at SO and its closing at $SO^1$, is sufficient to initiate the operation of the automatic brake application means, and the setting of the engineer's disabling valve, and this having been done, the brake solenoid can be reenergized, leaving the automatic mechanism to complete the stopping of the train.

The contact SO is arranged to open before $SO^1$ closes and conversely it closes before $SO^1$ opens. The rod $q$ will be held up to keep $SO^1$ closed when once closed as long as the vehicle is on dead territory, because the nut, after running off the upper end of the screw, will rest on the upper shoulder of the screw and hold the rod $q$ up. This condition will persist until the vehicle enters live territory again, whereupon the magnet of DR will be energized, attracting its armature and withdrawing the nut N from the upper shoulder of the screw, and allowing the nut to fall by gravity to its lowermost position out of engagement with the screw. The contact C falls with the nut and it is out of contact with the strip y. The green light goes on as soon as PR is energized.

It will be seen that the closing of contact SO is essential prior to the opening of SO¹, because if both contacts SO and SO¹ are open at the same time, then we would get a stop not desired. The order of operation of these contacts is therefore: On dead territory when operated by the distance control, SO must open before SO¹ closes, because the train might be going at 0 to 5 M. P. H., during which speeds contact 1 of low speed relay LS would be closed. On the reverse action, i. e., when rod q drops, SO must already have closed, so that the brake solenoid circuit will be closed before SO¹ opens, to avoid a brake application, by deenergizing the solenoid 30.

The no speed relay OS will in this latter form of the apparatus control the disabling valve lock DVL and the check light SCL, the stick relay and its circuit contact 2 being omitted.

Should the engineer have brought his train to a stop in the dead block short of braking distance from the red board by a manual operation of the brakes, and should he start up again while the block is still dead, he will get an automatic application when he arrives at braking distance from the entrance to the occupied or danger block, just the same as though he had continued running, because the nut will have travelled part of the length of the screw when he came to a stop and will travel the balance of the distance to the braking point after he starts up again.

In order that the contacts SO and SO¹ may be timed in their operation relative to each other, the contact SO¹ may be locked up when closed after SO has opened, such a lock being indicated at SL, and this lock will be released after contact SO closes by a projection on the rod q striking it. This locking means is also used with the contact St of Fig. 10.

The nut of the screw shaft may be provided with a pointer moving over graduations indicating the territory where the yellow light is on, also the red light territory and the point of braking, so that the engineer may know when his brakes must be applied in order to avoid an automatic stop. This is shown in Fig. 13.

A check is provided in respect to the flexible drive shaft of the distance relay. This is located at TS and should the flexible shaft break, the circuit to the brake solenoid 30 will be broken and the automatic brake application will result. This checking mechanism is shown in Fig. 12, in which the brake solenoid circuit is completed through a slidable contact f. A spring f', in case the flexible shaft fs breaks, will force this slidable contact out of place and break the solenoid circuit and stop the train. A similar checking device may be employed at the tachometer shaft in the circuit of the brake solenoid, as shown in Fig. 11, so that if the tachometer drive shaft brakes, a stop will occur.

The diagrams and description disclose embodiments of the invention, but it will be understood that these are illustrative and are not to be regarded as restrictive upon the scope of the claims setting forth the novel features.

Changes can be made in the wiring and in the instruments themselves.

I do not limit myself to the forms and combination of the EAV valve, engineer's disabling valve and automatic air release valve shown herein, as these may be changed and still be within the scope of the invention.

Where "indication means" is referred to in the claims it means either a signal or brake controlling means.

The primary relay PR, Fig. 18, is of the Depre D'Arsonval type, its armature or pointer closing on its contact, on say, potential above plus or minus 1.5 millivolt. This type of relay is like that made by the Weston Electrical Instrument Co. of Newark, N. J., Model 30, and disclosed as to its general features in Letters Patent of the United States of Edward Weston, for instance, #611,722, Oct. 4, 1898 or #446,489, Feb. 17, 1891.

Referring to Fig. 20, which shows the track circuits: Suppose a train enters block #3. Track relay T of the block #3 will deenergize and the contacts 125—126 will open circuit from the local battery LB and relay Ax contacts 123 and 124, 115 and 116 close the main circuit as follows:

Left rail: Plus of the main battery III¹, contact 114, pole line, contacts 115 and 116, left rail from point 118 to 151, conductor 151—119, contacts 119—110, contact 111, minus of battery.

Right rail: Plus of the main battery III, contact 122, pole line, contacts 123—124, right rail from point 117 to 161, conductor 161—171, contact 171—181, contact 191, minus of battery. The described paths of the main current on block #3 can exist only when the block ahead, #4, is clear. Relay Ax of this block is energized and contacts of this relay 119—110, 171—181 are closed. If, however, another train is on block #4, then the above described circuits of the main current on block #3 will open and the train entering this latter block will be stopped automatically by the absence of control current in the rails. Relay Bx of block #3 is shown energized. This condition will exist when blocks #4 and #5 are clear. Working circuit for this relay is: Relay Bx, point 127, pole line, plus of the main battery IV on block #4, minus of battery, contacts 181—171, right rail from 161 to 117, contact 124, relay Bx. If, however, relay Ax on block #5 is deenergized, by presence of another train in this block, contacts 171—181 will open above described circuit of relay Bx and its contacts drop. Contact arms of relay Bx will reverse the direction of main circuit on block #3, as can be easily traced from the drawing, this opposite direction of current in the rails will light an additional "advance signal" in the cab of the locomotive.

I claim:

1. In train control apparatus, a primary relay on the vehicle, energized from the track circuit, an electro-magnetic device on the vehicle controlled primarily by said relay for setting the brakes when de-energized, relay means for re-energizing the said device when the vehicle comes to a stop in a dead block, speed governed means, a no speed contact controlled thereby for energizing the relay means when the train comes to a stop to thereby cause re-energizing of the said electro-magnetic device as stated, a slow speed contact for maintaining said relay means energized as long as the train on resuming motion is running at the prescribed slow speed, but de-energizing said relay means if said slow speed is exceeded, to thereby de-energize the said electro-magnetic device for setting the brakes, substantially as described.

2. In train control apparatus, a primary relay on the vehicle energized from the track system, an electrically operated device on the vehicle controlled primarily by said relay for setting the brakes when de-energized, relay means having an armature in circuit with said device for re-energizing the same when the vehicle is in a dead block and at rest, a speed controlled relay for closing a circuit to said relay means for energizing the same when the vehicle comes to rest, and a slow speed controlled relay for maintaining said relay means energized as long as the train on resuming motion is running at the prescribed slow speed, but de-energizing said relay means if said slow speed is exceeded to thereby de-energize the said device for setting the brakes, substantially as described.

3. In train control apparatus, a primary relay on the vehicle energized from the track system, an electrically operated device on the vehicle for causing setting of the brakes when de-energized and controlled primarily by the primary relay, a brake deferring relay controlling the said electrical device to defer braking at a prescribed moderate speed, relay means to effect re-energizing of the said electrical device, after the train has come to a stop in a dead block, speed governed means for energizing said relay means when the train comes to rest, also for maintaining said relay means energized below a prescribed slow speed, and to de-energize said relay means, and therefore said device, when said slow speed is exceeded, to make a brake application, said speed governed means also eliminating the function of the brake deferring relay if the speed exceeds a prescribed moderate rate, substantially as described.

4. In train control apparatus, a primary relay on the vehicle energized from the track system, an electrical device on the vehicle for causing setting of the brakes when de-energized, relay means for effecting re-energizing of said device after the train has come to rest in a dead block, an engineer's disabling valve mechanism to insure the train coming to a stop when the said electrical device is de-energized, means for energizing the relay means when the train comes to rest to thereby re-energize said device, and speed governed means for maintaining said relay means energized below a resumed prescribed slow speed and to deenergize said relay means, and therefore said device, when said resumed slow speed is exceeded.

5. In train control apparatus, a primary relay on the vehicle energized from the track system, an electrical device on the vehicle for causing setting of the brakes when de-energized, relay means for effecting re-energizing of said device after the train has come to rest in a dead block, an engineer's disabling valve mechanism to insure the train coming to a stop when the said electrical device is de-energized, means for energizing the relay means when the train comes to rest to thereby re-energize said device, and speed governed means for maintaining said relay means energized below a resumed prescribed slow speed and to de-energize said relay means, and therefore said device, when said resumed slow speed is exceeded, said speed governed means including relays in series opening under different current strengths in respect to each other derived from a generator driven by the vehicle axle.

6. In train control apparatus, a primary relay on the vehicle energized from the track system, an electrically operated device on the vehicle for causing setting of the brakes when de-energized and controlled primarily by the primary relay, a brake deferring relay controlling the said electrical device to defer braking at a prescribed moderate speed, relay means to effect re-energizing of the said electrical device, after the train has come to a stop in a dead block, speed governed means for energizing said relay means when the train comes to rest, speed governed means for maintaining said relay means energized below a prescribed slow speed, and to de-energize said relay means, and therefore said device, when said slow speed is exceeded, to make a brake application, and speed governed means also eliminating the function of the brake deferring relay if the speed exceeds a prescribed moderate rate, each of said speed governed means including a relay, which are in series with each other and are adjusted to open their contacts in respect to each other under different electric current strengths derived from a generator driven by the vehicle axle, substantially as described.

7. In combination in train control apparatus, a primary relay on the vehicle energized from the track system and having three positions, clear, advance and neutral, a "clear" or normal relay, an advance relay, an electro-magnetic device for causing setting of the brakes when de-energized, an advance signal controlled through the advance relay, signals controlled through the clear relay, a brake deferring relay for deferring de-energizing of the said electro-magnetic device in a dead block at moderate speed, relay means for re-energizing the electro-magnetic device when the train comes to rest in a dead block, speed governed means for energizing said relay means when the train comes to rest as just stated, and speed governed means for de-energizing the relay means if the resumed speed exceeds a prescribed low limit, and speed governed means for eliminating the brake deferring relay when the train exceeds a prescribed moderate speed, substantially as described.

8. In combination in train control apparatus, a primary relay on the vehicle energized from the track circuit and having one position under a normal polarity current, another position under reverse polarity current, and a neutral position under no current, a slow acting relay energized in the normal position of the primary relay, a slow acting relay energized in the reverse position of the primary relay, and both relays being de-energized in the neutral position of the primary relay, and indication means on the vehicle consisting of brake controlling means, controlled by the said slow acting relays, substantially as described.

9. In train control apparatus, a primary relay on the vehicle, energized from the track circuit, an electro-magnetic device on the vehicle controlled primarily by said relay for setting the brakes when de-energized, a stick relay for re-energizing the said device when the vehicle comes to a stop in a dead block, speed governed means, a no speed contact controlled thereby for energizing the stick relay when the train comes to a stop to thereby cause re-energizing of the said electro-magnetic device as stated, a slow speed contact for maintaining said stick relay energized as long as the train on resuming motion is running at the prescribed slow speed, but de-energizing said stick relay if said slow speeed is exceeded, to thereby de-energize the said electro-magnetic device for setting the brakes, substantially as described.

10. In train control apparatus, a primary relay on the vehicle energized from the track system, an electrically operated device on the vehicle controlled primarily by said relay for setting the brakes when de-energized, a stick relay in circuit with said device for re-energizing the same when the vehicle is in a dead block and at rest, a speed controlled relay for closing a circuit to said stick relay for energizing the same when the vehicle comes to rest, and a slow speed controlled relay for maintaining said stick relay energized through its stick contact as long as the train on resuming motion is running at the prescribed slow speed, but de-energizing said stick relay if said slow speed is exceeded to thereby de-energize the said device for setting the brakes, substantially as described.

11. In train control apparatus, a primary relay on the vehicle energized from the track system, an electrically operated device on the vehicle for causing setting of the brakes when de-energized and controlled primarily by the primary relay, a brake deferring relay controlling the said electrical device to defer braking at a prescribed moderate speed, a stick relay to effect re-energizing of the said electrical device, after the train has come to a stop in a dead block, speed governed means for energizing said stick relay when the train comes to rest, also for maintaining said stick relay energized below a prescribed slow speed, and to de-energize said stick relay, and therefore said device, when said slow speed is exceeded, to make a brake application, said speed governed means also eliminating the function of the brake deferring relay if the speed exceeds a prescribed moderate rate, substantially as described.

12. In train control apparatus, a primary relay on the vehicle energized from the track system, an electrical device on the vehicle for causing setting of the brakes when de-energized, a stick relay for effecting re-energizing of said device after the train has come to rest in a dead block, an engineer's disabling valve mechanism to insure the train coming to a stop when the said electrical device is de-energized, means for energizing the stick relay when the train comes to rest to thereby re-energize said device, and speed governed means for maintaining said stick relay energized below a resumed prescribed slow speed and to de-energize said stick relay, and therefore said device, when said resumed slow speed is exceeded.

13. In train control apparatus, a primary relay on the vehicle energized from the track system, an electrical device on the vehicle for causing setting of the brakes when de-energized, a stick relay for effecting re-energizing of said device after the train has come to rest in a dead block, an engineer's disabling valve mechanism to insure the train coming to a stop when the said electrical device is de-energized, means for energizing the stick relay when the train comes to rest to thereby re-energized said device, and speed governed means for maintaining said stick relay energized below a resumed prescribed slow speed and to de-energize said stick relay, and therefore said device, when said resumed slow speed is exceeded, said speed governed means including relays in series openings under different current strengths in respect to each other derived from a generator driven by the vehicle axle.

14. In train control apparatus, a primary relay on the vehicle energized from the track system, an electrically operated device on the vehicle for causing setting of the brakes when de-energized and controlled primarily by the primary relay, a brake deferring relay controlling the said electrical device to defer braking at a prescribed moderate speed, a stick relay to effect re-energizing of the said electrical device, after the train has come to a stop in a dead block, speed governed means for energizing said stick relay when the train comes to rest, speed governed means for maintaining said stick relay energized below a prescribed slow speed, and to de-energize said stick relay, and therefore said device, when said slow speed is exceeded, to make a brake application, and speed governed means also eliminating the function of the brake deferring relay if the speed exceeds a prescribed moderate rate, each of said speed governed means including a relay, which are in series with each other and are adjusted to open their contacts in respect to each other under different electric current strengths derived from a generator driven by the vehicle axle, substantially as described.

15. In combination in train control apparatus, a primary relay on the vehicle energized from the track system and having three positions, clear, advance and neutral, a "clear" or normal relay, an advance relay, an electro-magnetic device for causing setting of the brakes when de-energized, an advance signal controlled through the advance relay, signals controlled through the clear relay, a brake deferring relay for deferring de-energizing of the said electro-magnetic device in a dead block at moderate speed, a stick relay for re-energizing the electro-magnetic device when the train comes to rest in a dead block, speed governed means for energizing said stick relay when the train comes to rest as just stated, and speed governed means for de-energizing the stick relay if the resumed speed exceeds a prescribed low limit, and speed governed means for eliminating the brake deferring relay when the train exceeds a prescribed moderate speed, substantially as described.

16. In combination in train control apparatus, a primary relay on the vehicle energized from the track circuit and having one position under a normal polarity current, another position under reverse polarity current and a neutral position under no current, a slow acting relay energized in the normal position of the primary relay, a slow acting relay energized in the reverse position of the primary relay, and both relays being de-energized in the neutral position of the primary relay, and indication means on the vehicle, controlled by the said slow acting relays, substantially as described.

17. In train stop apparatus, the combination of a primary relay on the engine energized from the track circuits and having three positions, one normal, when energized by a current of normal polarity, a reverse position, when energized by a current of reverse polarity, and a neutral position for no current, three signals, viz, clear, caution and danger, electro-magnetic means on the vehicle for causing setting of the brakes when the primary relay is de-energized, speed controlled means, a brake deferring relay to defer automatic braking in a dead block for a prescribed time interval, controlled by said speed controlled device to render it effective at a moderate speed and ineffective at a high speed, circuit connections for lighting the caution signal in a dead block at moderate speed, or the danger signal at high speed, and circuit connections for lighting a pair of signals for an advance indication when the train is in an advance block, at least one of said signals being one of the three first mentioned, substantially as described.

18. In combination in train control apparatus, three signals on the engine for clear, caution and danger, and means for displaying a signal in an advance block, i. e., the block on the approach side of the caution block, when restrictive conditions exist beyond said caution block, said signal including at least one of the three signals mentioned, substantially as described.

19. In combination in train control apparatus, a primary relay on the vehicle, an electrically operated device on the engine controlled primarily thereby and when de-energized causing the setting of the brakes, a disabling valve mechanism for disabling the engineer from recharging the train pipe, means for locking said valve mechanism in disabling position, means for automatically re-energizing the said electrical device to permit the brakes to be released, and for releasing the lock of the disabling valve, said means being rendered operative when the train comes to a stop, and means for maintaining the energized condition of said device at a resumed slow speed, and for de-energizing said device for the setting of the brakes if said speed is exceeded, substantially as described.

20. In combination in train control apparatus, speed governed contact means for opening and closing controlling circuits on the vehicle, a signal which is lighted when the train is standing and the no speed contact is closed, said no speed contact being closed automatically when the speed governor means fails, while the train is running, whereupon said signal will be lighted to notify the engineer of such failure, substantially as described.

21. In combination in train control apparatus, speed governed means for opening and closing controlling circuits on the vehicle, a signal which is set when the train is standing and eliminated when the train is moving, said signal serving as a check of speed control means by being set to give the signal when said speed controlled means fails, bringing about a condition in the apparatus equivalent to the conditions when the vehicle is standing, substantially as described.

22. In combination in train control apparatus, a primary relay on the vehicle energized continuously by current from the traffic rail system of an energized block, and de-energized when the vehicle is on a dead block, a distance control relay having a member driven from the vehicle axle, and a member driven thereby and travelling a distance proportionate to the distance travelled by the vehicle, when in driving engagement with said first mentioned member, said distance control relay also including an electro-magnetic device controlled by the primary relay and causing the engagement of the members mentioned, when said primary relay is de-energized, and means of train control controlled by said travelling member, said means of train control including an electric circuit on the vehicle, which when closed holds automatic brake applying means inactive, and when broken by said distance travelling member causes the setting of the brakes, and an electric circuit, including a stick relay having a contact which is closed in part by said distance travelling member, said stick relay having its circuit completed when the train comes to a stop by a no speed relay controlled contact, and closing a local circuit of the automatic brake applying means to restore said means to normal position with brakes released, substantially as described.

23. In combination in train control apparatus, a primary relay on the vehicle energized continuously by current from the traffic rail system of an energized block, and de-energized when the vehicle is on a dead block, a distance control relay having a member driven from the vehicle axle, and a member driven thereby and travelling a distance proportionate to the distance travelled by the vehicle, when in driving engagement with said first mentioned member, said distance control relay also including an electro-magnetic device controlled by the primary relay and causing the engagement of the members mentioned, when said primary relay is de-energized, and means of train control controlled by said travelling member, said means of train control including an electric circuit on the vehicle, which when closed holds automatic brake applying means inactive, and when broken by said distance travelling member causes the setting of the brakes, and an electric circuit, including a stick relay having a contact which is closed in part by said distance travelling member, said stick relay having its circuit completed when the train comes to a stop by a no speed relay controlled contact, and closing a local circuit of the automatic brake applying means to restore said means to normal position with brakes released, and a contact controlled by said stick relay for relighting the caution signal on the engine, substantially as described.

24. In combination in train control apparatus, a primary relay in a conductor receiving current from the traffic rail system due to the drop in potential between its points of contact with the rail system, an electro-magnetic brake controlling device on the engine, a distance control relay in circuit with the primary relay, and when de-energized causing one of its members to travel a distance proportionate to the distance of the braking point from the entrance of the dead block, said distance relay automatically opening the circuit of said electro-magnetic braking means when the braking point is reached, means for disabling the engineer's automatic brake valve from recharging the train line and releasing the brakes until the train comes to a stop, and means for automatically re-energizing the electro-magnetic device is the dead block as a consequence of the train coming to a stop, so that the train can proceed, substantially as described.

25. In combination in train control apparatus, a primary relay in a conductor receiving current from the traffic rail system due to the drop in potential between its points of contact with the rail system, an electro-magnetic brake controlling device on the engine, a distance control relay in circuit with the primary relay, and when de-energized causing one of its members to travel a distance proportionate to the distance of the braking point from the entrance of the dead block, said distance relay automatically opening the circuit of said electro-magnetic braking means when the braking point is reached, means for disabling the engineer's automatic brake valve from recharging the train line and releasing the brakes until the train comes to a stop, and means for automatically re-energizing the electro-magnetic device in the dead block as a consequence of the train coming to a stop, so that the train can proceed, and means for de-energizing said electro-magnetic device for applying the brakes if the train exceeds a prescribed low speed.

26. In combination, a valve for discharging to atmosphere equalizing reservoir pressure for a brake application, a solenoid which when energized holds the valve closed against equalizing reservoir pressure tending to open it, an engineer's disabling valve to cut off his automatic brake valve from the main reservoir to deprive him of air for recharging the train line, said disabling valve being operated into its cut off position by equalizing reservoir air through the valve first mentioned, and means for operating said first mentioned valve, according to the electrical condition of the block, substantially as described.

27. In combination, a valve controlling an exhaust port for equalizing reservoir air, a solenoid controlling said valve, an engineer's disabling valve, a valve connected with the valve first mentioned for supplying equalizing reservoir air pressure to said engineer's disabling valve for closing it to prevent the engineer from recharging the train line, a bleed port for the discharge of the operative equalizing reservoir pressure from the said disabling valve, and means connected to the solenoid operated valve for controlling said bleed port, substantially as described.

28. In combination with an engineer's automatic brake valve having an equalizing piston chamber with a piston therein for controlling the B. P. Ex. port valve for the discharge of train line air, a controlling valve controlling a port for the discharge of equalizing reservoir air pressure to atmosphere for thus controlling in turn the B. P. Ex. valve by lowering the pressure in the piston chamber, an engineer's disabling valve for preventing him from recharging the train pipe, said disabling valve being operated by equalizing reservoir pressure, and means for operating the controlling valve automatically, substantially as described.

29. Apparatus according to claim 28, in which the equalizing reservoir air is supplied to close the disabling valve before the port to atmosphere is opened for the discharge of said equalizing air pressure.

30. Apparatus according to claim 28, in which a valve controls the supply of equalizing reservoir air to the disabling valve and is connected with the said controlling valve to move therewith.

31. In combination in train stop apparatus, an engineer's disabling valve for preventing the engineer from recharging the train line for releasing the brakes, valve mechanism for supplying equalizing reservoir air pressure for closing said disabling valve, and for discharging equalizing reservoir air to atmosphere for a brake application and electromagnetic means for operating said valve mechanism, said valve mechanism being closed when said electro-magnetic means is energized, and a bleed port which is opened when said valve mechanism is closed for bleeding air pressure from the engineer's disabling valve for its return to open position, substantially as described.

In testimony whereof, I affix my signature.

PATRICK J. CLIFFORD.